United States Patent Office 3,391,178
Patented July 2, 1968

3,391,178
DIALKYLAMINOALKYL 1-OXO-2a,3,4,5-TETRAHYDROACENAPHTHEN-2a-CARBOXYLATES
Ernest E. Campaigne, 1240 E. Wylie St., Bloomington, Ind. 47401; Wendell Lee Roelofs, 71 Grove St., Apt. 10, Arlington, Mass. 02351; and Richard F. Weddleton, Evermann Apts., 463, Bloomington, Ind. 47401
No Drawing. Filed Dec. 30, 1964, Ser. No. 422,399
4 Claims. (Cl. 260—469)

ABSTRACT OF THE DISCLOSURE 2a,3,4,5-tetrahydroacenaphthen - 1 - ones exhibit central nervous system depressant activity and are useful as anticonvulsants and sedatives.

This invention relates to novel compounds. More particularly, this invention relates to novel substituted tetrahydroacenaphthenones which possess central nervous system depressant activity, and to a process for the preparation thereof. In another aspect, this invention relates to a novel method of depressing the central nervous system.

It is an object of the present invention to provide a new class of chemical compounds. It is another object of the present invention to provide novel compounds having central nervous system depressant activity, and a process for the preparation thereof. It is a further object of the present invention to provide a novel method of depressing the central nervous system.

These and other objects which may appear as the specification proceeds are achieved by this invention which comprises the provision of compounds selected from the group consisting of compounds having the following formula (I)
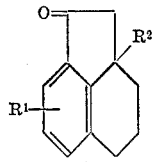

and the pharmaceutically acceptable nontoxic salts thereof. In Formula I, $R^1$ is a member selected from the group consisting of hydrogen, chloro, bromo, iodo, fluoro, trifluoromethyl, (lower)alkyl, (lower)alkoxy, (lower)alkanoyl, and (lower)alkanoyloxy; and
$R^2$ is a member selected from the group consisting of cyano and a radical having the formula (II)
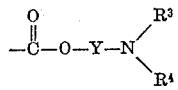

wherein $R^3$ and $R^4$ each represent a member selected from the group consisting of (lower)alkyl, (lower)alkenyl, (lower)alkynyl, phenyl(lower)alkyl, cycloalkyl radicals having from 3 to 7 carbon atoms inclusive, e.g. cyclopropyl, cyclobutyl, cyclopentyl, cyclohexyl and cycloheptyl, and when taken together with

constitute a heterocyclic ring selected from the group consisting of pyrrolidino, (lower)alkylpyrrolidino, piperidino, (lower)alkylpiperidino, morpholino, (lower)alkylmorpholino, 1,2,5,6-tetrahydropyridino, (lower)alkyl-1,2,5,6 - tetrahydropyridino, N' - (lower)alkylpiperazino, N' - (lower)alkyl - (lower)alkylpiperazino, hexamethyleneimino and (lower)alkylhexamethyleneimino; and Y is a (lower)alkylene radical having from 1 to 8 carbon atoms, e.g. methylene, ethylene, propylene, isopropylene, butylene, t-butylene, amylene, hexylene and 2-ethylhexylene.

The pharmaceutically acceptable nontoxic salts include the organic and inorganic acid addition salts, e.g., those prepared from acids such as hydrochloric, sulfuric, sulfamic, tartaric, fumaric, hydrobromic, hydriodic, glycolic, citric, maleic, phosphoric, succinic, acetic, nitric and the like.

The term "(lower)alkyl" as used herein means both straight and branched chain alkyl radicals containing from 1 to 8 carbon atoms, e.g. methyl, ethyl, propyl, isopropyl, butyl, isobutyl, t-butyl, amyl, hexyl, 2-ethylhexyl, etc.

The term "(lower)alkenyl" as used herein means both straight and branched chain alkenyl radicals containing from 2 to 8 carbon atoms, e.g. ethenyl, allyl, 1-propenyl, 1-butenyl, 3-butenyl, 2-methyl-1-propenyl, 3-pentenyl, 1-hexenyl, 7-octenyl, etc.

The term "(lower)alkenyl" as used herein means both straight and branched chain alkenyl radicals containing from 2 to 8 carbon atoms, e.g. ethinyl, propargyl, 1-butinyl, 2-butinyl, 1,1-dimethylpropargyl, 1-pentinyl, 1-heptinyl, etc.

Similarly, where the term "(lower)" is used as part of the description of another group, e.g., (lower)alkoxy it refers to the alkyl portion of such group which is therefore as described in connection with (lower)alkyl.

Preferred compounds of the present invention are those having the following formulae (III)
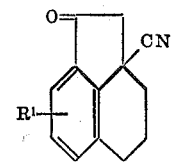

(IV)
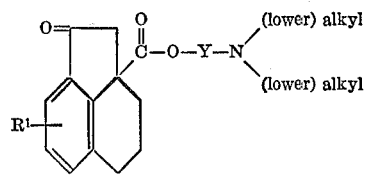

(V)
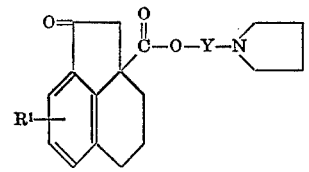

(VI)
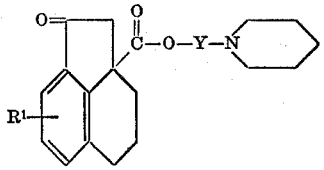

(VII)
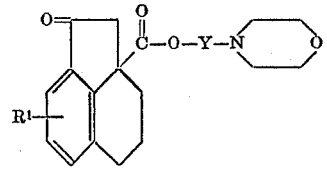

(VIII) 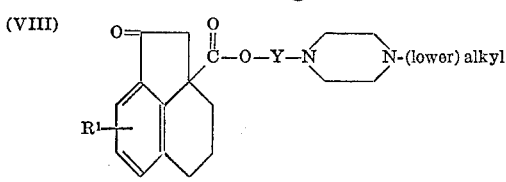

wherein R¹ and Y are as represented above.

The compounds of this invention are valuable pharmaceutical agents. They produce a depressant effect on the central nervous system which makes them useful for depressing the central nervous system. The compounds are particularly useful for the depression of spinal transmission, as anticonvulsants for controlling various types of convulsant seizures, and as sedatives.

When, for example, one of the preferred compounds of this invention, β - diethylaminoethyl - 1 - oxo-2a,3,4,5-tetrahydroacenaphthen - 2a - carboxylate hydrochloride, was administered orally to mice at dosages of 300 mg./kg., the compound protected the mice against both electrically-induced and Metrazol-induced convulsions. When another of the preferred compounds of this invention, 2a-cyano-2a,3,4,5 - tetrahydroacenaphthen - 1-one, was administered orally to mice at dosages of 300 mg./kg., the compound protected the mice against Metrazol-induced convulsions. When still another of the preferred compounds of this invention, γ-dimethylaminopropyl-1-oxo-2a,3,4,5-tetrahydroacenaphthen - 2a - carboxylate hydrochloride, was administered orally to mice at dosages of 300 mg./kg., the compound strongly depressed spinal transmission.

The compounds of the present invention can be compounded and formulated into pharmaceutical preparations for oral or parenteral administration with organic or inorganic solid materials or liquids that are pharmaceutically acceptable carriers. The compositions may take the form of tablets, effervescent tablets, powders, granules, capsules (both hard and soft shell capsules), suspensions, solutions, emulsions, injectable solutions and suspensions and the like. Such compositions are considered within the scope of this invention.

The compounds of the present invention (Formula I) wherein R² is cyano, are prepared by the hydrolysis of a compound having the following formula (IX) 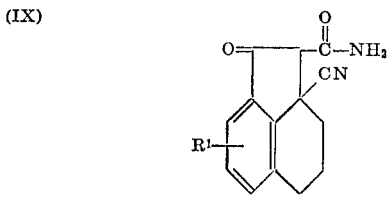

wherein R¹ is as described above. The hydrolysis reaction is conveniently carried out by contacting a compound of Formula IX with a weak mineral acid preferably aqueous phosphoric acid (20%) at elevated temperature, e.g., heating the reaction mixture on a steam bath for 12 hours.

The compounds of Formula IX are novel intermediates and are considered a part of this invention, and are prepared by the reaction of an indenone having the following formula (X) 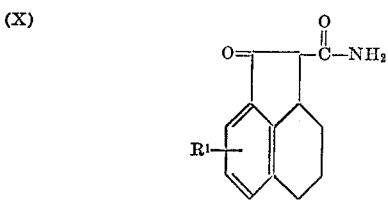

wherein R¹ is as described above, with an alkali metal cyanide, e.g., sodium cyanide. The procedure is generally described by C. F. Koelsch in J. Org. Chem., vol. 25, pp. 2088–2091, and specifically described in Example 1 herein.

The compounds of Formula I wherein R² is other than cyano are prepared by the reaction of an acid halide of a compound of the formula (XI) 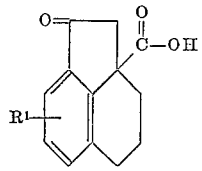

wherein R¹ is as described above, preferably an acid chloride with an alcohol of the formula (XII) 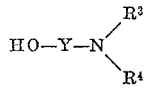

wherein R³, R⁴ and Y are as described above. The reaction is preferably carried out at a low temperature, e.g., 0–20° C.

The compounds of Formula XI are novel intermediates and considered a part of the invention, and are conveniently prepared by the hydrolysis of a compound of Formula IX with a strong mineral acid, preferably aqueous sulfuric acid (5–35%) at elevated temperature, e.g., heating the reaction on a steam bath for 20 hours. These compounds are then conveniently converted to acid halides by reacting with thionyl chloride.

The starting materials used in the process described herein are compounds which are either commercially available, well-known in the art, or easily prepared in accordance with standard organic procedures previously described in the chemical literature. For example, the preparation of 2-carboxamido-3,4 - trimethyleno - 1 - indenone (included in Formula X) is described in J. Org. Chem., vol. 26, pp. 4702–4704 and vol. 27, p. 4428–4432.

The compositions of this invention when administered orally or parenterally in an effective amount are effective in depressing the central nervous system.

The following examples are intended to illustrate the invention described herein without unduly restricting it.

Example 1.—Preparation of 2-carboxamido-2a-cyano-2a,3,4,5-tetrahydroacenaphthen-1-one

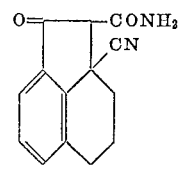

Five grams of 2-carboxamido-3,4-trimethyleno-1-indenone, 20 ml. of water, 7 gm. of t-butanol, and 2 gm. of sodium cyanide were placed in a beaker and stirred for 5 minutes while heating gently on the steam bath. A dark red solution resulted which was cooled to 0° C. after standing at room temperature for several hours. The solution was acidified with 20% sulfuric acid to Congo red, and diluted to 250 ml. with water. A yellow precipitate was produced which was collected by filtration, giving 5.5 gm. of crude product, melting at 202–205° C. Several recrystallizations from 95% ethanol gave colorless crystals of 2-carboxamido-2a-cyano-2a,3,4,5-tetrahydroacenaphthen-1-one, having a melting point of 212–214° C., exhibiting an infrared absorption spectrum in KBr having maxima at the following wavelengths (in microns):

$\lambda_{Max.}^{KBr}$ 2.92μ ($NH_2$), 4.5μ (CN), 5.83μ (CO), 6.0μ ($CONH_2$)

and an ultraviolet absorption spectrum in 95% ethanol with maxima at the following wavelengths (in millimicrons):

$\lambda_{Max.}^{95\% \, EtOH}$ 256 mμ ($\epsilon = 10,100$), and 296 mμ ($\epsilon = 2,700$)

and having the following elemental analysis:

Analysis.—Calcd. for $C_{14}H_{12}N_2O_2$: C, 69.98%; H, 5.04%; N, 11.75%. Found: C, 70.17%; H, 5.22%; N, 11.78%.

Example 2.—Preparation of 2-a-cyano-2a,3,4,5-tetrahydroacenaphthen-1-one

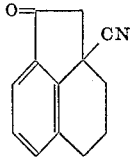

A mixture of 1 gm. of 2-carboxamido-2a-cyano-2a,3,4,5-tetrahydroacenaphthen-1-one in 40 ml. of 20% phosphoric acid was heated on the steam bath for 12 hours. The resulting solution was poured into 100 ml. of water, and cooled in the refrigerator. The white solid was collected and extracted with 5% sodium bicarbonate, leaving 0.2 gm. of crude product, having a melting point of 110–112° C. Recrystallization from 95% ethanol gave colorless crystals of 2a-cyano-2a,3,4,5-tetrahydroacenaphthen-1-one, having a melting point of 123–124° C., exhibiting an infrared absorption spectrum in KBr having maxima at the following wavelengths (in microns):

$\lambda_{Max.}^{KBr}$ 4.5$\mu$ (CN), 5.85$\mu$ (CO)

having the following elemental analysis:

Analysis.—Calcd. for $C_{13}H_{11}NO$: C, 79.16%; H, 5.62%; N, 7.10%. Found: C, 79.34%; H, 5.68%; N, 8.08%, and having the following molecular weight as determined in $CHCl_3$:

Molecular weight calcd. for $C_{13}H_{11}NO$: 197.2. Found: 204.

Example 3.—Preparation of 2a-carboxy-2a,3,4,5-tetrahydroacenaphthen-1-one

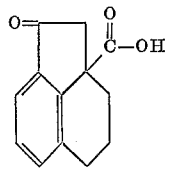

A solution of 5 gm. of 2-carboxamido-2a-cyano-2a,3,4,5-tetrahydroacenaphthen-1-one in 100 ml. of 10% sulfuric acid was heated on the steam bath for 20 hours. It was then cooled and 4.3 gm. of crude product, having a melting point of 153–166° C., was collected. Recrystallization of the crude product from water yielded colorless plates of 2a-carboxy-2a,3,4,5-tetrahydroacenaphthen-1-one, having a melting point of 175.5–176.5° C., exhibiting an infrared absorption spectrum in KBr having maxima at the following wavelengths (in microns):

$\lambda_{Max.}^{KBr}$ 3.6$\mu$, 3.8$\mu$ and 3.9$\mu$ (bonded OH); 5.8$\mu$ (CO); 5.93$\mu$ (COOH)

and having the following elemental analysis:

Analysis.—Calcd. for $C_{13}H_{12}O_3$: C, 72.21%; H, 5.60%. Found: C, 72.50%; H, 5.86%.

Example 4.—Preparation of β-diethylaminoethyl 1-oxo-2a,3,4,5-tetrahydroacenaphthen-2a-carboxylate hydrochloride

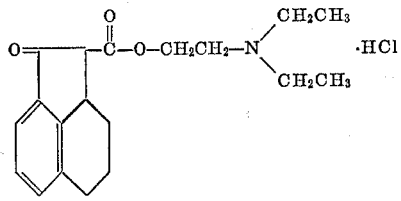

A quantity of 5.0 gm. (19 millimols) of 2a-carboxy-2a,3,4,5-tetrahydroacenaphthen-1-one was dissolved in a minimum amount of boiling dry benzene in a 300-ml. round-bottomed three-neck flask, 4.55 gm. (38 millimols) of thionyl chloride (distilled from quinoline, then redistilled from linseed oil) was added dropwise over a period of 10 minutes from a pressure equalizing separatory funnel, and the mixture was refluxed on a steam bath for 1 hour. The excess thionyl chloride was removed as an azeotrope with benzene (2 liters of benzene being distilled). The reaction mixture was cooled in an ice bath, and 2.26 gm. (19 millimols) of 2-diethylaminoethanol was added dropwise over a period of 20 minutes. The mixture was stirred in an ice bath for 1 hour, then at room temperature for 1 hour, the solvent removed by a stream of air; the resulting oil was dissolved in a small amount of n-propyl alcohol and hydrogen chloride bubbled through, yielding 2.7 gm. of a white solid, crude product, having a melting point of 170–183° C. Recrystallization from isopropanol yielded a white powder, β-diethylaminoethyl 1-oxo-2a,3,4,5-tetrahydroacenaphthen-2a-carboxylate hydrochloride having a melting point of 205–206° C., exhibiting an infrared absorption spectrum in KBr having maxima at the following wavelengths (in microns):

$\lambda_{Max.}^{KBr}$ 3.38$\mu$ (CH), 3.64$\mu$, 3.87$\mu$ and 4.05$\mu$ (NH+), 5.79$\mu$ (CO) and 5.90$\mu$ ($CO_2R$)

and having the following elemental analysis:

Analysis.—Calcd. for $C_{19}H_{26}NO_3Cl$: C, 64.85%; H, 7.45%; Cl, 10.08%. Found: C, 64.95%; H, 7.36%; Cl, 10.18%.

Example 5.—Preparation of γ-dimethylaminopropyl 1-oxo - 2a,3,4,5 - tetrahydroacenaphthen-2a-carboxylate hydrochloride

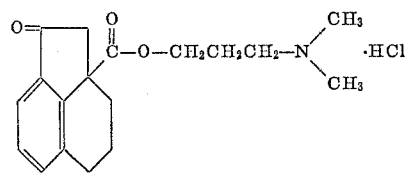

A quantity of 5.0 gm. (19 millimols) of 2a-carboxy-2a,3,4,5-tetrahydroacenaphthen-1-one was dissolved in a minimum amount of boiling dry benzene in a 300-ml. round-bottomed three-neck flask, 4.55 gm. (38 millimols) of thionyl chloride (distilled from quinoline, then redistilled from linseed oil) was added dropwise over a period of 10 minutes from a pressure equalizing separatory funnel, and the mixture refluxed on a steam bath for 1 hour. The excess thionyl chloride was removed as an azeotrope with benzene (2 liters of benzene being distilled). The reaction mixture was cooled in an ice bath, and 1.99 gm. (19 millimols) of 3-dimethylaminopropanol was added dropwise over a period of 20 minutes. The mixture was stirred in an ice bath for 1 hour, then at room temperature for 1 hour, the solvent removed by a stream of air; the resulting oil was dissolved in a small amount of n-propyl alcohol, and hydrogen chloride bubbled through, yielding 1.3 gm. of a slightly yellowish white powder, crude product, having a melting point of 179–182° C. Recrystallization from isopropanol yielded a white powder, γ-dimethylaminopropyl 1-oxo-2a,3,4,5-tetrahydroacenaphthen-2a-carboxylate hydrochloride, having a melting point of 183–184° C., exhibiting an infrared absorption spectrum in KBr, having maxima at the following wavelengths (in microns):

$\lambda_{Max.}^{KBr}$ 3.41$\mu$ (CH), 3.91$\mu$ and 4.09$\mu$ (NH+), and 5.87$\mu$ (broad) (CO and $CO_2R$)

and having the following elemental analysis:

Analysis.—Calcd. for $C_{18}H_{24}NO_3Cl$: C, 63.99%; H, 7.16%; Cl, 10.09%. Found: C, 63.70%; H, 7.23%; Cl, 10.68%.

Example 6

When, in the procedure of Example 1, 2-carboxomido-3,4-trimethyleno-1-indenone is replaced by an equal molar amount of 2-carboxamido-3,4-trimethyleno-5-bromo-1-indenone,
2-carboxamido-3,4-trimethyleno-6-chloro-1-indenone,
2-carboxamido-3,4-trimethyleno-5-trifluoromethyl-1-indenone,
2-carboxamido-3,4-trimethyleno-7-methyl-1-indenone,
2-carboxamido-3,4-trimethyleno-5-ethyl-1-indenone,
2-carboxamido-3,4-trimethyleno-6-iodo-1-indenone,
2-carboxamido-3,4-trimethyleno-7-fluoro-1-indenone,
2-carboxamido-3,4-trimethyleno-5-methoxy-1-indenone,
2-carboxamido-3,4-trimethyleno-6-trifluoromethyl-1-indenone,
2-carboxamido-3,4-trimethyleno-6-acetyl-1-indenone,
2-carboxamido-3,4-trimethyleno-5-acetoxy-1-indenone and
2-carboxamido-3,4-trimethyleno-7-butyl-1-indenone, there are obtained, 2-carboxamido-2a-cyano-6-bromo-2a,3,4,5-tetrahydroacenaphthen-1-one,
2-carboxamido-2a-cyano-7-chloro-2a,3,4,5-tetrahydroacenaphthen-1-one,
2-carboxamido-2a-cyano-6-trifluoromethyl-2a,3,4,5-tetrahydroacenaphthen-1-one,
2-carboxamido-2a-cyano-8-methyl-2a,3,4,5-tetrahydroacenaphthen-1-one,
2-carboxamido-2a-cyano-6-ethyl-2a,3,4,5-tetrahydroacenaphthen-1-one,
2-carboxamido-2a-cyano-7-iodo-2a,3,4,5-tetrahydroacenaphethn-1-one,
2-carboxamido-2a-cyano-8-fluoro-2a,3,4,5-tetrahydroacenaphthen-1-one,
2-carboxamido-2a-cyano-6-methoxy-2a,3,4,5-tetrahydroacenaphthen-1-one,
2-carboxamido-2a-cyano-7-trifluoromethyl-2,3,4,5-tetrahydroacenaphthen-1-one,
2-carboxamido-2a-cyano-7-acetyl-2a,3,4,5-tetrahydroacenaphthen-1-one,
2-carboxamido-2a-cyano-6-acetoxy-2a,3,4,5-tetrahydroacenaphthen-1-one and
2-carboxamido-2a-cyano-8-butyl-2a,3,4,5-tetrahydroacenaphthen-1-one, respectively.

Example 7

When, in the procedure of Example 2, 2-carboxamido-2a - cyano - 2a,3,4,5-tetrahydroacenaphthen-1-one is replaced by an equal molar amount of each of the products of Example 6, the following compounds are obtained, 2a-cyano-6-bromo-2a,3,4,5-tetrahydroacenaphthen-1-one,
2a-cyano-7-chloro-2a,3,4,5-tetrahydroacenaphthen-1-one,
2a-cyano-6-trifluoromethyl-2a,3,4,5-tetrahydroacenaphthen-1-one,
2a-cyano-8-methyl-2a,3,4,5-tetrahydroacenaphthen-1-one,
2a-cyano-6-ethyl-2a,3,4,5-tetrahydroacenaphthen-1-one,
2a-cyano-7-iodo-2a,3,4,5-tetrahydroacenaphthen-1-one,
2a-cyano-8-fluoro-2a,3,4,5-tetrahydroacenaphthen-1-one,
2a-cyano-6-methoxy-2a,3,4,5-tetrahydroacenaphthen-1-one,
2a-cyano-7-trifluoromethyl-2a,3,4,5-tetrahydroacenaphthen-1-one,
2a-cyano-7-acetyl-2a,3,4,5-tetrahydroacenaphthen-1-one,
2a-cyano-6-hydroxy-2a,3,4,5-tetrahydroacenaphthen-1-one, and
2a-cyano-8-butyl-2a,3,4,5-tetrahydroacenaphthen-1-one, respectively.

Example 8

When, in the procedure of Example 3, 2-carboxamido-2a - cyano - 2a,3,4,5 - tetrahydroacenaphthen - 1 - one is replaced by an equal molar amount of each of the products of Example 6, the following compounds are obtained, 2a-carboxy-6-bromo-2a,3,4,5-tetrahydroacenaphthen-1-one,
2a-carboxy-7-chloro-2a,3,4,5-tetrahydroacenaphthen-1-one,
2a-carboxy-6-trifluoromethyl-2a,3,4,5-tetrahydroacenaphthen-1-one,
2a-carboxy-8-methyl-2a,3,4,5-tetrahydroacenaphthen-1-one,
2a-carboxy-6-ethyl-2a,3,4,5-tetrahydroacenaphthen-1-one,
2a-carboxy-7-iodo-2a,3,4,5-tetrahydroacenaphthen-1-one,
2a-carboxy-8-fluoro-2a,3,4,5-tetrahydroacenaphthen-1-one,
2a-carboxy-6-methoxy-2a,3,4,5-tetrahydroacenaphthen-1-one,
2a-carboxy-7-trifluoromethyl-2a,3,4,5-tetrahydroacenaphthen-1-one,
2a-carboxy-7-acetyl-2a,3,4,5-tetrahydroacenaphthen-1-one,
2a-carboxy-6-hydroxy-2a,3,4,5-tetrahydroacenaphthen-1-one, and
2a-carboxy-8-butyl-2a,3,4,5-tetrahydroacenaphthen-1-one, respectively.

Example 9

When, in the procedure of Example 4, 2a-carboxy-2a,3,4,5-tetrahydroacenaphthen-1-one is replaced by an equal molar amount of each of the products of Example 8, the hydrochloride salts of the following compounds are obtained, $\beta$-diethylaminoethyl 1-oxo-6-bromo-2a,3,4,5-tetrahydroacenaphthen-2a-carboxylate,
$\beta$-diethylaminoethyl 1-oxo-7-chloro-2a,3,4,5-tetrahydroacenaphthen-2a-carboxylate,
$\beta$-diethylaminoethyl 1-oxo-8-methyl-2a,3,4,5-tetrahydroacenaphthen-2a-carboxylate,
$\beta$-diethylaminoethyl 1-oxo-6-ethyl-2a,3,4,5-tetrahydroacenaphthen-2a-carboxylate,
$\beta$-diethylaminoethyl 1-oxo-7-iodo-2a,3,4,5-tetrahydroacenaphthen-2a-carboxylate,
$\beta$-diethylaminoethyl 1-oxo-8-fluoro-2a,3,4,5-tetrahydroacenaphthen-2a-carboxylate,
$\beta$-diethylaminoethyl 1-oxo-6-methoxy-2a,3,4,5-tetrahydroacenaphthen-2a-carboxylate,
$\beta$-diethylaminoethyl 1-oxo-7-trifluoromethyl-2a,3,4,5-tetrahydroacenaphthen-2a-carboxylate,
$\beta$-diethylaminoethyl 1-oxo-7-acetyl-2a,3,4,5-tetrahydroacenaphthen-2a-carboxylate,
$\beta$-diethylaminoethyl 1-oxo-6-hydroxy-2a,3,4,5-tetrahydroacenaphthen-2a-carboxylate and
$\beta$-diethylaminoethyl 1-oxo-8-butyl-2a,3,4,5-tetrahydroacenaphthen-2a-carboxylate, respectively.

Example 10

When, in the procedure of Example 5, 2a-carboxy-2a,3,4,5-tetrahydroacenaphthen-1-one is replaced by an equal molar amount of each of the products of Example 8, the hydrochloride salts of the following compounds are obtained, $\gamma$-dimethylaminopropyl 1-oxo-6-bromo-2a,3,4,5-tetrahydroacenaphthen-2a-carboxylate,
$\gamma$-dimethylaminopropyl 1-oxo-7-chloro-2a,3,4,5-tetrahydroacenaphthen-2a-carboxylate,
$\gamma$-dimethylaminopropyl 1-oxo-6-trifluoromethyl-2a,3,4,5-tetrahydroacenaphthen-2a-carboxylate,
$\gamma$-dimethylaminopropyl 1-oxo-8-methyl-2a,3,4,5-tetrahydroacenaphthen-2a-carboxylate,
$\gamma$-dimethylaminopropyl 1-oxo-6-ethyl-2a,3,4,5-tetrahydroacenaphthen-2a-carboxylate,
$\gamma$-dimethylaminopropyl 1-oxo-7-iodo-2a,3,4,5-tetrahydroacenaphthen-2a-carboxylate,
$\gamma$-dimethylaminopropyl 1-oxo-8-fluoro-2a,3,4,5-tetrahydroacenaphthen-2a-carboxylate,
$\gamma$-dimethylaminopropyl 1-oxo-6-methoxy-2a,3,4,5-tetrahydroacenaphthen-2a-carboxylate, γ-dimethylaminopropyl 1-oxo-7-trifluoromethyl-2a,3,4,5-tetrahydroacenaphthen-2a-carboxylate,
γ-dimethylaminopropyl 1-oxo-7-acetyl-2a,3,4,5-tetrahydroacenaphthen-2a-carboxylate,
γ-dimethylaminopropyl 1-oxo-6-hydroxy-2a,3,4,5-tetrahydroacenaphthen-2a-carboxylate and
γ-dimethylaminopropyl 1-oxo-8-butyl-2a,3,4,5-tetrahydroacenaphthen-2a-carboxylate, respectively.

Example 11

When, in the procedure of Example 4, 2-diethylaminoethanol is replaced by an equal molar amount of dimethylaminomethanol,
2-N-ethyl-N-methylaminoethanol,
4-diethylaminobutanol,
7-dimethylaminoheptanol,
6-diethylaminohexanol,
1-(2-hydroxyethyl)-4-methylpiperazine,
1-(2-hydroxyethyl)piperidine,
1-(2-hydroxyethyl)pyrrolidine,
1-(3-hydroxypropyl)-2-methylpyrrolidine,
1-(2-hydroxyethyl)-3-ethylpiperidine,
1-(3-hydroxypropyl)-2,4-dimethylpiperazine,
4-(2-hydroxyethyl)morpholine,
4-(4-hydroxybutyl)-3-methylmorpholine,
1-(2-hydroxyethyl)-1,2,5,6-tetrahydropyridine,
1-hydroxymethyl-2-methyl-1,2,5,6-tetrahydropyridine,
1-(2-hydroxyethyl)hexamethyleneimine,
1-(2-hydroxypropyl)-3-propylhexamethyleneimine,
2-dimethylaminoethanol,
2-dimethylaminopropanol,
2-dioctylaminoethanol,
2-N-methyl-N-phenylethanol,
3-diethenylaminopropanol,
2-dipropenylaminoethanol,
2-diethinylaminoethanol,
2-dipropinylaminoethanol,
3-diphenylaminopropanol,
2-dibenzylaminoethanol,
4-dicyclohexylaminobutanol,
2-dicyclopropylaminoethanol,
2-dicyclopentylaminoethanol,
3-diphenethylaminopropanol, and
2-N-benzyl-N-cyclopropylaminoethanol, there are obtained the hydrochloride salts of the following compounds, dimethylaminomethyl 1-oxo-2a,3,4,5-tetrahydroacenaphthen-2a-carboxylate,
β-(N-ethyl-N-methylamino)ethyl 1-oxo-2a,3,4,5-tetrahydroacenaphthen-2a-carboxylate,
δ-diethylaminobutyl 1-oxo-2a,3,4,5-tetrahydroacenaphthen-2a-carboxylate,
η-dimethylaminoheptyl 1-oxo-2a,3,4,5-tetrahydroacenaphthen-2a-carboxylate,
ξ-diethylaminohexyl 1-oxo-2a,3,4,5-tetrahydroacenaphthen-2a-carboxylate,
β-(1-4-methylpiperazino)ethyl 1-oxo-2a,3,4,5-tetrahydroacenaphthen-2a-carboxylate,
β-(1-piperidino)ethyl 1-oxo-2a,3,4,5-tetrahydroacenaphthen-2a-carboxylate,
β-(1-pyrrolidino)ethyl 1-oxo-2a,3,4,5-tetrahydroacenaphthen-2a-carboxylate,
γ-(1-2-methylpyrrolidino)propyl 1-oxo-2a,3,4,5-tetrahydroacenaphthen-2a-carboxylate,
β-(1-3-ethylpiperidino)ethyl 1-oxo-2a,3,4,5-tetrahydroacenaphthen-2a-carboxylate,
γ-(1-2,4-dimethylpiperazino)propyl 1-oxo-2a,3,4,5-tetrahydroacenaphthen-2a-carboxylate,
β-(4-morpholino)ethyl 1-oxo-2a,3,4,5-tetrahydroacenaphthen-2a-carboxylate,
δ-(4-3-methylmorpholino)butyl 1-oxo-2a,3,4,5-tetrahydroacenaphthen-2a-carboxylate,
β-(1-tetrahydropyridino)ethyl 1-oxo-2a,3,4,5-tetrahydroacenaphthen-2a-carboxylate,
(1-2-methyl-1,2,5,6-tetrahydropyridino)methyl 1-oxo-2a,3,4,5-tetrahydroacenaphthen-2a-carboxylate,
β-(1-hexamethyleneimino)ethyl 1-oxo-2a,3,4,5-tetrahydroacenaphthen-2a-carboxylate,
α-(methyl)-β-(1-3-propylhexamethyleneimino)ethyl 1-oxo-2a,3,4,5-tetrahydroacenaphthen-2a-carboxylate,
β-dimethylaminoethyl 1-oxo-2a,3,4,5-tetrahydroacenaphthen-2a-carboxylate,
α-methyl-β-dimethylaminoethyl 1-oxo-2a,3,4,5-tetrahydroacenaphthen-2a-carboxylate,
β-dioctylaminoethyl 1-oxo-2a,3,4,5-tetrahydroacenaphthen-2a-carboxylate,
β-N-methyl-N-phenylaminoethyl 1-oxo-2a,3,4,5-tetrahydroacenaphthen-2a-carboxylate,
γ-diethenylaminopropyl 1-oxo-2a,3,4,5-tetrahydroacenaphthen-2a-carboxylate,
β-dipropenylaminoethyl 1-oxo-2a,3,4,5-tetrahydroacenaphthen-2a-carboxylate,
β-diethinylaminoethyl 1-oxo-2a,3,4,5-tetrahydroacenaphthen-2a-carboxylate,
β-dipropinylaminoethyl 1-oxo-2a,3,4,5-tetrahydroacenaphthen-2a-carboxylate,
γ-diphenylaminopropyl 1-oxo-2a,3,4,5-tetrahydroacenaphthen-2a-carboxylate,
β-dibenzylaminoethyl 1-oxo-2a,3,4,5-tetrahydroacenaphthen-2a-carboxylate,
δ-dicyclohexylaminobutyl 1-oxo-2a,3,4,5-tetrahydroacenaphthen-2a-carboxylate,
β-dicyclopropylaminoethyl 1-oxo-2a,3,4,5-tetrahydroacenaphthen-2a-carboxylate,
β-dicyclopentylaminoethyl 1-oxo-2a,3,4,5-tetrahydroacenaphthen-2a-carboxylate,
γ-diphenethylaminopropyl 1-oxo-2a,3,4,5-tetrahydroacenaphthen-2a-carboxylate and
β-N-benzyl-N-cyclopropylaminoethyl 1-oxo-2a,3,4,5-tetrahydroacenaphthen-2a-carboxylate, respectively.

While this invention has been described and exemplified in terms of its preferred embodiment, those skilled in the art will appreciate that modifications can be made without departing from the spirit and scope of this invention.

What is claimed is:

1. A compound selected from the group consisting of compounds of the formula

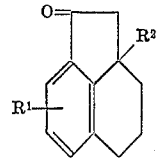

wherein $R^1$ is a member selected from the group consisting of hydrogen, chloro, bromo, iodo, fluoro, trifluoromethyl, (lower)alkyl and (lower)alkoxy; and
$R^2$ is a radical having the formula

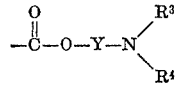

wherein $R^3$ and $R^4$ each are (lower)alkyl, and Y is (lower)alkylene;

and the pharmaceutically acceptable nontoxic salts thereof.

2. A compound having the formula

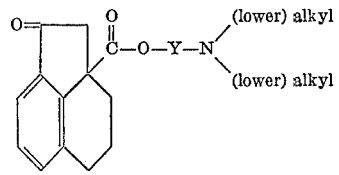

wherein Y is (lower)alkylene.

3. The compound having the formula
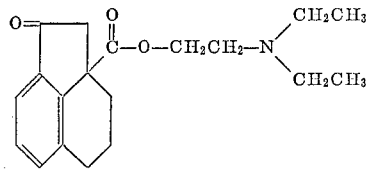
4. The compound having the formula
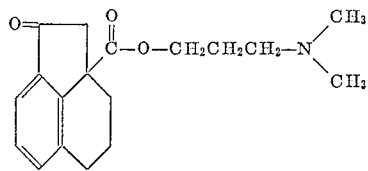
References Cited
UNITED STATES PATENTS
2,589,934   3/1952   Glenn et al. _____ 260—247.7
CHARLES B. PARKER, *Primary Examiner.*
D. H. TORRENCE, *Assistant Examiner.*